United States Patent
Rakshit et al.

(10) Patent No.: US 11,178,336 B1
(45) Date of Patent: Nov. 16, 2021

(54) ALTERING DEVICE CAPTURE SETTINGS THROUGH USER FEEDBACK

(71) Applicant: INTERNATIONAL BUSINESS MACHINES CORPORATION, Armonk, NY (US)

(72) Inventors: Sarbajit K. Rakshit, Kolkata (IN); Zachary A. Silverstein, Jacksonville, FL (US); Robert Huntington Grant, Marietta, GA (US); Jose Luis Alejandro Villegas Palencia, Grapevine, TX (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 16/867,609

(22) Filed: May 6, 2020

(51) Int. Cl.
*H04N 5/222* (2006.01)
*H04N 5/232* (2006.01)

(52) U.S. Cl.
CPC ... *H04N 5/232939* (2018.08); *H04N 5/23219* (2013.01); *H04N 5/23222* (2013.01)

(58) Field of Classification Search
CPC ......... H04N 5/232939; H04N 5/23219; H04N 5/23222
USPC .................................................... 348/333.02
See application file for complete search history.

(56) References Cited

U.S. PATENT DOCUMENTS

| | | | |
|---|---|---|---|
| 8,248,482 B2 | 8/2012 | Eduard | |
| 9,646,198 B2 | 5/2017 | Cunico | |
| 9,672,445 B2 | 6/2017 | Osindero | |
| 2014/0185906 A1* | 7/2014 | Ding | G01N 33/49 382/134 |
| 2016/0127641 A1 | 5/2016 | Gove | |
| 2017/0315825 A1* | 11/2017 | Gordon | G06N 20/00 |
| 2019/0065966 A1 | 2/2019 | Vijil | |

OTHER PUBLICATIONS

Amazon, "The world's first deep learning enabled video camera for developers", https://aws.amazon.com/deeplens/, accessed Feb. 21, 2020, 8 pages.

(Continued)

*Primary Examiner* — Usman A Khan
(74) *Attorney, Agent, or Firm* — Michael O'Keefe

(57) ABSTRACT

An embodiment for photographic capture setting modification is provided. The embodiment may include capturing user feedback of a photograph. The embodiment may include identifying user preferences for one or more device parameters based on image recognition and machine learning of the photograph and the captured user feedback, respectively. The embodiment may further include generating a corpus. The embodiment may also include, in response to determining a user is preparing to capture a photograph, deriving one or more viewfinder tags for a scene currently within a viewfinder of a capture device. The embodiment may further include identifying one or more device parameters based on a matching of the one or more derived viewfinder tags and the one or more contextual tags. The embodiment may also include, in response to determining current user settings of the one or more identified device parameters do not match the identified user preferences, performing an action.

20 Claims, 6 Drawing Sheets

(56) References Cited

OTHER PUBLICATIONS

Carbune, et al., "Predicted Image-Capture Device Settings through Machine Learning", Technical Disclosure Commons, Mar. 22, 2019, 8 pages.
Honor, "Take a Perfect selfie with Beauty Mode in HONOR 10 Lite", https://www.techbone.net/honor/10-lite/user-manual, accessed Mar. 2, 2020, 4 pages.
Mell et al., "The NIST Definition of Cloud Computing", National Institute of Standards and Technology, Special Publication 800-145, Sep. 2011, 7 pages.

* cited by examiner

ALTERING DEVICE CAPTURE SETTINGS THROUGH USER FEEDBACK

BACKGROUND

The present invention relates generally to the field of computing, and more particularly to photographic capture devices.

Photography relates to the field of capturing images by recording light, or other electromagnetic radiation, through an electronic capture device or, chemically, through a light-sensitive medium, such as photographic film. An electronic capture device, or a photographic capture device, relates to any device capable of receiving light through a sensor and generating an image based on the light pattern captured by the sensor. A photographic capture device may be communicatively coupled with a user device where the primary purpose of the user device may not be for photographic capture, such as a smartphone. Common photographic capture devices may include still image and video camera of various sizes and quality. Many current photographic capture devices may allow a user to edit a captured photograph through user interactions with a graphical user interface. For example, a user may apply a color-changing filter or add text or graphics to a captured photograph.

SUMMARY

According to one embodiment, a method, computer system, and computer program product for photographic capture setting modification is provided. The embodiment may include capturing user feedback of a photograph. The embodiment may also include identifying user preferences for one or more device parameters based on image recognition and machine learning of the photograph and the captured user feedback, respectively, where each identified user preference has one or more contextual tags. The embodiment may further include generating a corpus, wherein the corpus comprises the identified user preferences. The embodiment may also include, in response to determining a user is preparing to capture a photograph, deriving one or more viewfinder tags for a scene currently within a viewfinder of a capture device. The embodiment may further include identifying one or more device parameters based on a matching of the one or more derived viewfinder tags and the one or more contextual tags. The embodiment may also include, in response to determining current user settings of the one or more identified device parameters do not match the identified user preferences, performing an action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
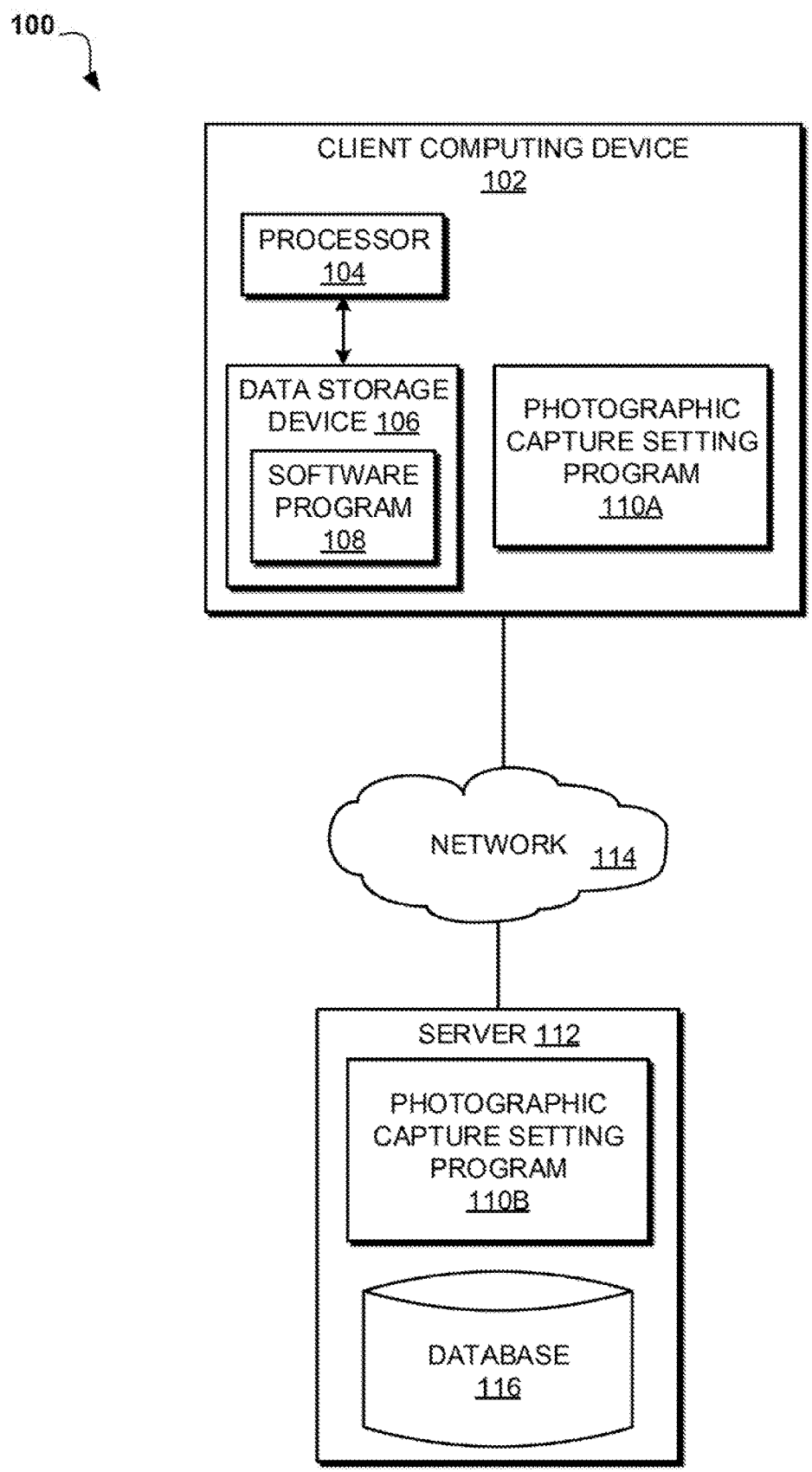
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to photographic capture devices. The following described exemplary embodiments provide a system, method, and program product to, among other things, utilize speech-to-text and natural language processing (NLP) to understand user feedback and sentiment to a captured photograph and, accordingly, modify capture settings so subsequent photographs conform to user preferences. Therefore, the present embodiment has the capacity to improve the technical field of photographic capture devices by conserving system resources necessary to process multiple photographs that do not conform to user preferences.

As previously described, photography relates to the field of capturing images by recording light, or other electromagnetic radiation, through an electronic capture device or, chemically, through a light-sensitive medium, such as photographic film. An electronic capture device, or a photographic capture device, relates to any device capable of receiving light through a sensor and generating an image based on the light pattern captured by the sensor. A photographic capture device may be communicatively coupled with a user device where the primary purpose of the user device may not be for photographic capture, such as a smartphone. Common photographic capture devices may include still image and video camera of various sizes and quality. Many current photographic capture devices may allow a user to edit a captured photograph through user interactions with a graphical user interface. For example, a user may apply a color-changing filter or add text or graphics to a captured photograph.

Many smart mobile devices are enabled with highly configurable cameras that allow users to capture photographs without difficulty. Available settings include zoom level, aperture, filters, brightness, and shading. However, despite the available settings, not every captured photograph may be of high quality. For example, after capture, a photographer may review a photograph, either self-captured or being peer reviewed, and orally critique the image (e.g., "The brightness should be higher"). As such, it may be advantageous to, among other things, capture user feedback and sentiment to a captured photograph and adjust device settings accordingly.

According to at least one embodiment, capture of a user's sentiments, emotions, or comments on a photograph may be enabled on a photographic capture device through a sensor, such as a microphone. Through machine learning, a knowledge corpus of historical user sentiments to specific photographs may be created to identify the user's photographic need in specific situations. When the user focuses a capture device towards a surrounding, the device may identify the contextual surrounding and, using the knowledge corpus, identify appropriate settings under with a photograph should be captured. In at least one embodiment, if any emotion, sentiment, or comments are related to non-device parameters (e.g., an unwanted object is present or a subject is obstructed), then the capture device may provide voice-based guidance to the user while capturing the photograph so the issue may be corrected. In at least one other embodiment, user behavior while capturing the photograph, such as capturing multiple photographs or previewing a photograph and recapturing, may be tracked and included within the knowledge corpus so such behavior may be considered by a machine learning module.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilizing user comment sentiment on historical photographs to alter capture setting of a photographic capture device.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a photographic capture setting program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a photographic capture setting program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the photographic capture setting program 110A, 110B may be a program capable of capturing comments when a user is reviewing a photograph, analyzing the user comments to determine user sentiment towards aspects and characteristics of the photograph, and modifying device settings of a photographic capture device when preconfigured parameters are satisfied, such as when a similar setting to a historical photographed is experienced again. The photographic capture setting method is explained in further detail below with respect to FIGS. 2 and 3.

Figure 2:
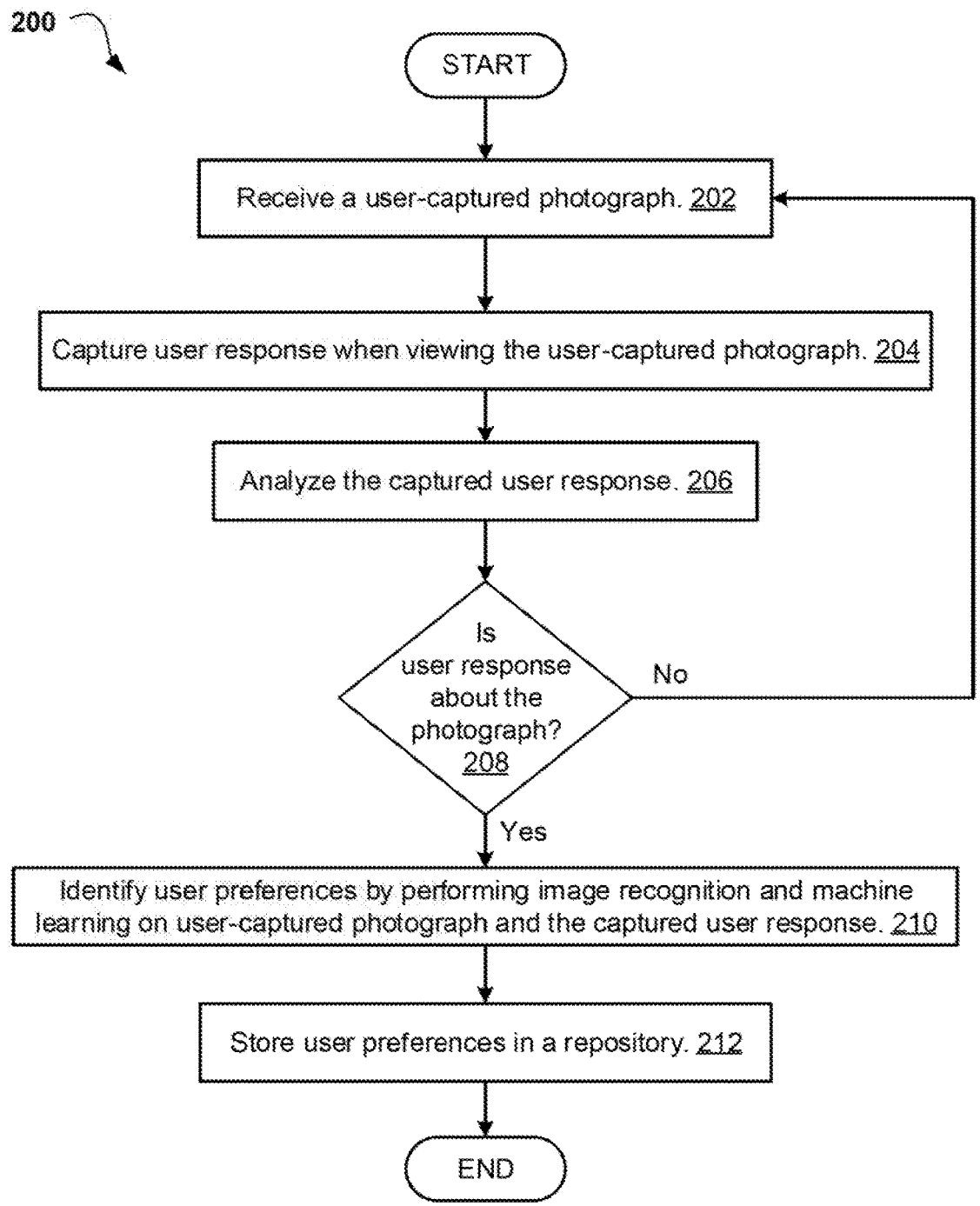
FIG. 2 illustrates an operational flowchart for creating a corpus in a photographic capture setting process according to at least one embodiment.

Referring now to FIG. 2, an operational flowchart illustrating creating a corpus in a photographic capture setting process 200 is depicted according to at least one embodiment. At 202, the photographic capture setting program 110A, 110B receives a user-captured photograph. During traditional operation of a user device capable of photographic capture, such as a camera or a smartphone with a communicatively or embedded camera, a user may capture a photographic image of surrounding entities. For example, a user may take a picture of nearby scenery that is aesthetically pleasing.

Then, at 204, the photographic capture setting program 110A, 110B captures a user response when viewing the user-captured photograph. While reviewing a captured photograph, a user may orient the front of the user device, such as a smartphone, so a display screen is within the user's view. Utilizing an embedded or communicatively coupled microphone or camera, the photographic capture setting program 110A, 110B may capture photographer voice-based feedback (e.g., user commentary), facial expressions, a change in behavior, user body language, deletion of the photograph, or recapture of the photograph. For example, the photographic capture setting program 110A, 110B may capture user voice-based feedback stating "I should have applied a color filter", "the aperture should be reduced", or "Object X should be brighter". Each item of commentary or user behavior may be captured by the photographic capture setting program 110A, 110B for subsequent analysis to determine the user's preferences in capturing a photograph and which photographic capture device setting should be adjusted to achieve the user's preferences.

In at least one embodiment, the photographic capture setting program 110A, 110B may utilize surrounding devices to capture a user's reaction when reviewing a photograph, such as a nearby smart television, laptop, voice assistant device, wearable smart device or any other device capable of capturing data and transmitting the captured data to a device, such as client computing device 102 or server 112, hosting the photographic capture setting program 110A, 110B. Any user reaction data captured by surrounding devices may be transmitted to either the photographic capture setting program 110A in client computing device 102 or the photographic capture setting program 110B in server 110B for aggregation and analysis.

Next, at 206, the photographic capture setting program 110A, 110B analyzes the captured user response. Once captured, the photographic capture setting program 110A, 110B may analyze the vocal commentary or user actions to determine the user's preferences for photographic capture under various circumstances. When processing the user's facial expressions, the photographic capture setting program 110A, 110B may utilize known facial recognition techniques to determine specific expressions the user is displaying. For example, the photographic capture setting program 110A, 110B may be capable of determining a user is expressing a smile at a photograph through facial recognition. When processing voice-based user comments, the photographic capture setting program 110A, 110B may utilize known natural language understanding and natural language processing techniques to determine the content of the spoken user comments. For example, the photographic capture setting program 110A, 110B may be capable of determining context of a user's statement and the vocal inflection to determine the user is pleased with a captured photograph.

Some user feedback of a photograph may not relate to settings criteria. The photographic capture setting program 110A, 110B may be capable of controlling and, therefore, may be bypassed, or not stored, within a repository, such as database 116. For example, if the user voice-based feedback states, "Jane has such a good smile", the photographic capture setting program 110A, 110B may analyze the statement to be a characteristic of an individual within the photograph and not feedback relating to adjustable settings of the photograph. Therefore, the photographic capture setting program 110A, 110B may disregard the user statement "Jane has such a good smile" and proceed to analysis of the next captured user response.

Then, at 208, the photographic capture setting program 110A, 110B determines whether the user response relates to the captured photograph. Some user responses or feedback may not relate to the photograph and may be disregarded by the photographic capture setting program 110A, 110B. The photographic capture setting program 110A, 110B may be capable of determining whether voice-based feedback or facial expressions relate to the photograph based on the context of the feedback or whether user eye gaze is directed towards the user device display screen. For example, if the instant user voice-based feedback is that statement "it is such a nice day outside", the photographic capture setting program 110A, 110B may determine, through natural language processing, that the statement relates to a topic not directly relevant to the captured photograph itself. Similarly, if a user exhibits a specific facial expression but the user's eye gaze is directed away from the display screen of the user device, the photographic capture setting program 110A, 110B may determine that the exhibited facial expression does not relate to the captured photograph. If the photographic capture setting program 110A, 110B determines the user response relates to the captured photograph (step 208, "Yes" branch), then the photographic capture setting process 200 may proceed to step 210 to perform image recognition on the user-captured photograph. If the photographic capture setting program 110A, 110B determines the user response does not relate to the captured photograph (step 208, "No" branch), then the photographic capture setting process 200 may return to step 202 to receive a user-captured photograph.

Next, at 210, the photographic capture setting program 110A, 100B identifies user preferences by performing image recognition and machine learning on the user-captured photograph and the captured user response. Once the photographic capture setting program 110A, 110B determines the user response relates to the captured photograph, image recognition and machine learning may be performed on the captured photograph to consider the user's sentiment, the photograph against which the user's sentiment was collected, context of the voice-based comments, a change in the user's behavior, etc. Furthermore, an image analysis module may extract image objects from the previewed captured photograph, a contextual relationship with the user comments, and various changes in behavior, facial expressions, body language, etc. The photographic capture setting program 110A, 110B may additionally perform machine learning on the extracted data to identify towards which contextual situations specific types of comments relate. For example, a specific comment from a user may relate to the lighting of the photograph. Based on the user comment, associated image object, and machine learning of the extracted data, the photographic capture setting program 110A, 110B may be capable of identifying which specific feedback item is related to a particular camera setting. For example, if a user comment relates to lighting of a photograph, the photographic capture setting program 110A, 110B may be capable of determining that the brightness setting should be altered up or down based on the context of the user's comment. Furthermore, the photographic capture setting program 110A, 110B may utilize machine learning to determine which user comments and sentiments relate to camera settings and which user comments and sentiments relate to a change in the physical orientation of a photographic capture device, the photographer, or the subject(s) of photographic capture. Similarly, the photographic capture setting program 110A, 110B may utilize machine learning to determine when the user should wait a specific amount of time to capture the photograph when lighting and/or positions are better. For example, if the photographic capture setting program 110A, 110B determines that lighting will be better in an hour due to a predicted weather forecast, the photographic capture setting program 110A, 110B may direct the user to wait to capture the photograph. In order to determine when a particular photograph may be more conducive for later capture, the photographic capture setting program 110A, 110B may be capable of accessing a database containing weather and/or lighting information, such as a weather forecasting website.

In at least one embodiment, the photographic capture setting program 110A, 110B may tag specific criteria associated with the photograph and the user actions that took place as a result of those criteria. For example, if a picture was taken outdoors in a well-lit area and the user commented that the brightness should be lowered in order to capture a better image, the photographic capture setting program 110A, 110B may tag the image accordingly so that the user setting that may have been subsequently modified may be stored in a repository, such as database 116, for subsequent access when the user encounters similar photographic capture criteria. Additionally, the photographic capture setting program 110A, 110B may be capable of determining whether a subsequent picture was captured and any setting changes altered by the user in order to determine not only the user setting with which to associate the tag but also the value of the user setting with which to associate the tag.

In at least one other embodiment, the photographic capture setting program 110A, 110B may variably weigh certain user feedback based on the severity of the user sentiment or comment magnitude. For example, a user's body language or facial cues may indicate that the user is either extremely dissatisfied or, conversely, extremely satisfied with a captured photograph. Photographic capture device settings may be adjusted accordingly based on the determined severity. For example, if the user appears extremely dissatisfied by the darkness of a photograph by letting out an audible grunt and throwing his/her arms in the air, the photographic capture setting program 110A, 110B may indicate that, under similar lighting, the brightness settings should be significantly altered.

Furthermore, the magnitude in a change in user sentiment between viewing multiple captures of a photograph may be utilize by the photographic capture setting program 110A, 110B to determine the preferred user setting. For example, if a user is dissatisfied with a first capture and retakes the photograph but then has a response of "That's a little bit better", the photographic capture setting program 110A, 110B may determine that a slight alteration to the user settings is still warranted.

Additionally, the photographic capture setting program 110A, 110B may consider time decay or picture differences to reduce the impact or alteration of future photographs.

Then, at 212, the photographic capture setting program 110A, 110B stores the user preferences in a repository. Once the photographic capture setting program 110A, 110B has performed image recognition and machine learning on the user-captured photograph and the captured user response, the photographic capture setting program 110A, 110B may store the results in a repository, such as database 116, for later analysis and utilization when a user attempts to capture a subsequent photograph with similar characteristics to those of the user-captured photograph.

Figure 3:
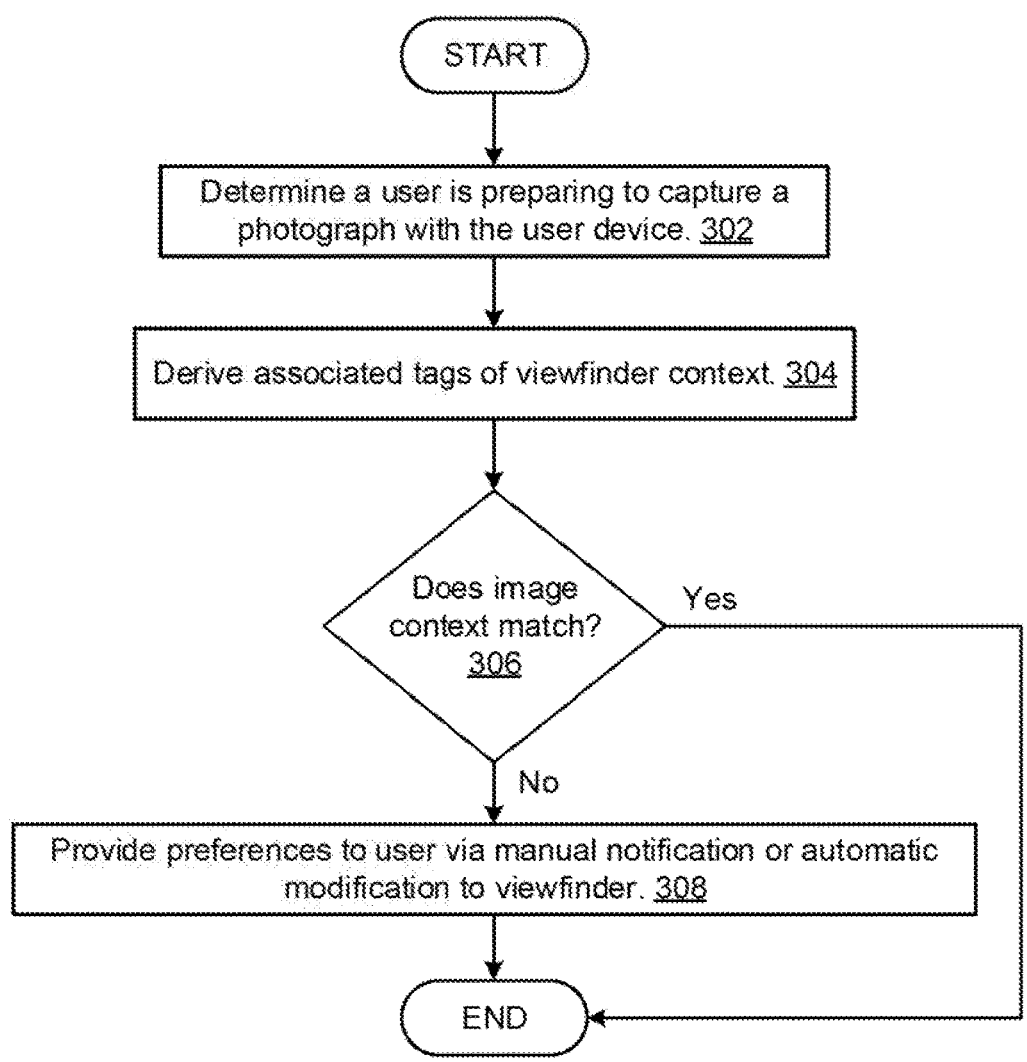
FIG. 3 illustrates an operational flowchart for applying a corpus in a photographic capture setting process according to at least one embodiment.

Referring now to FIG. 3, an operational flowchart for applying a corpus in a photographic capture setting process 300 is depicted according to at least one embodiment. At 302, the photographic capture setting program 110A, 110B determines a user is preparing to capture a photograph with the user device. Once a knowledge base has been established in a repository, such as database 116, the photographic capture setting program 110A, 110B may monitor device usage to determine when a user is preparing to capture a photograph. For example, on a smartphone, the user may open a photographic capture application, such as a generic, pre-installed camera application or a downloadable social media application, such as Instagram® (Instagram and all Instagram-based trademarks and logos are trademarks or registered trademarks of Facebook, Inc. and/or its affiliates).

Then, at 304, the photographic capture setting program 110A, 110B derives associated tags of viewfinder context. Once the photographic capture setting program 110A, 110B determines the user is preparing the capture a photograph, the photographic capture setting program 110A, 110B may analyze the information, using image recognition technology, being presented within the viewfinder, in real-time, in order to derive tags associated with the photograph the user is preparing to capture. For example, if the user is preparing to capture an image of a group of people in a well-lit, outdoor scene, the photographic capture setting program 110A, 110B may derive tags for "outdoor", "well-lit", or "sunny". A viewfinder is, typically, a physical device through which a user looks in order to capture a photograph with a camera. However, in at least one embodiment, a viewfinder may also relate to a display screen of a smart device, such as a smartphone, on, or through, which a user previews an image before performing photographic capture.

Next, at 306, the photographic capture setting program 110A, 110B determines whether parameters of the photographic capture device match those of the identified tags from the viewfinder context. Once the photographic capture setting program 110A, 110B has analyzed the viewfinder context to determine which tags are most applicable, the photographic capture setting program 110A, 110B may compare the settings associated with all identified tags (e.g., the view finder context) to determine if the capture parameters (e.g., aperture setting, brightness setting, focus, zoom, contrast, and resolution) match historical preference settings within the knowledge corpus for the user based on the stored user preferences associated with each identified tag. If the photographic capture setting program 110A, 110B determines the parameters of the photographic capture device match those of the identified tags from the viewfinder context (step 306, "Yes" branch), then the photographic capture setting process 300 may terminate. If the photographic capture setting program 110A, 110B determines the parameters of the photographic capture device do not match those of the identified tags from the viewfinder context (step 306, "No" branch), then the photographic capture setting process 200 may continue to step 308 to provide preferences to the user via manual notification or automatic modification.

Then, at 308, the photographic capture setting program 110A, 110B provides preferences to the user via manual notification or automatic modification to the viewfinder. Should the photographic capture setting program 110A, 110B determine that modifications to the photographic capture device parameters are needed based on the stored user preferences, the photographic capture setting program 110A, 110B may display a notification to the user on a graphical user interface of the photographic capture device indicating the parameters the user may desire to modify based on historical user settings for photographs captured under similar viewfinder situations. In at least one alternate embodiment, the photographic capture setting program 110A, 110B may automatically adjust the parameters of the photographic capture device based on the user settings associated with the identified tags in order to expedite the photographic capture process for the user. For example, the photographic capture setting program 110A, 110B may automatically determine that when taking similar photographs the user's image preference is to focus in on a specific subject and may, therefore, zoom in and auto-focus on the subject matter.

It may be appreciated that FIGS. 2 and 3 provide only an illustration of one implementation and does not imply any limitations with regard to how different embodiments may be implemented. Many modifications to the depicted environments may be made based on design and implementation requirements. In at least one embodiment, the photographic capture setting program 110A, 110B may be able to determine, from the user feedback, that an item within a captured photograph relates to non-camera parameters, such as an unwanted object being present in the photograph or a subject being obscured. In such situations, the photographic capture setting program 110A, 110B may be capable of providing a visual notification to the user on user device display screen or voice-based guidance, through speaker embedded or communicatively coupled to the user device, to the user instructing the user to correct the non-camera parameter. For example, the photographic capture setting program 110A, 110B may sends a notification or a voice-based alert the user to "Turn camera to face the left, it is your preferred angle" in a particular viewfinder capture.

In at least one embodiment, the user may provide feedback or commentary on another individual's photograph. In such circumstances, the photographic capture setting program 110A, 110B may be capable of determining when feedback or commentary is provided for a photograph captured by an individual other than the user. In such situations, the photographic capture setting program 110A, 110B may generate a separate knowledge corpus associated with the individual rather than the user for utilization by the individual to improve the quality of the individual's photographic capture.

In at least one other embodiment, the photographic capture setting program 110A, 110B may be capable of accepting user feedback from multiple users to generate a knowledge base of crowdsourced opinions from various other users.

In yet another embodiment, the photographic capture setting program 110A, 110B may be provided to a social network and ran against social media tagged photographs similarly as described above. Doing so will enable trusted users or users within a social network to understand the user's preferences or specifically alert the user to preferred pictures.

Figure 4:
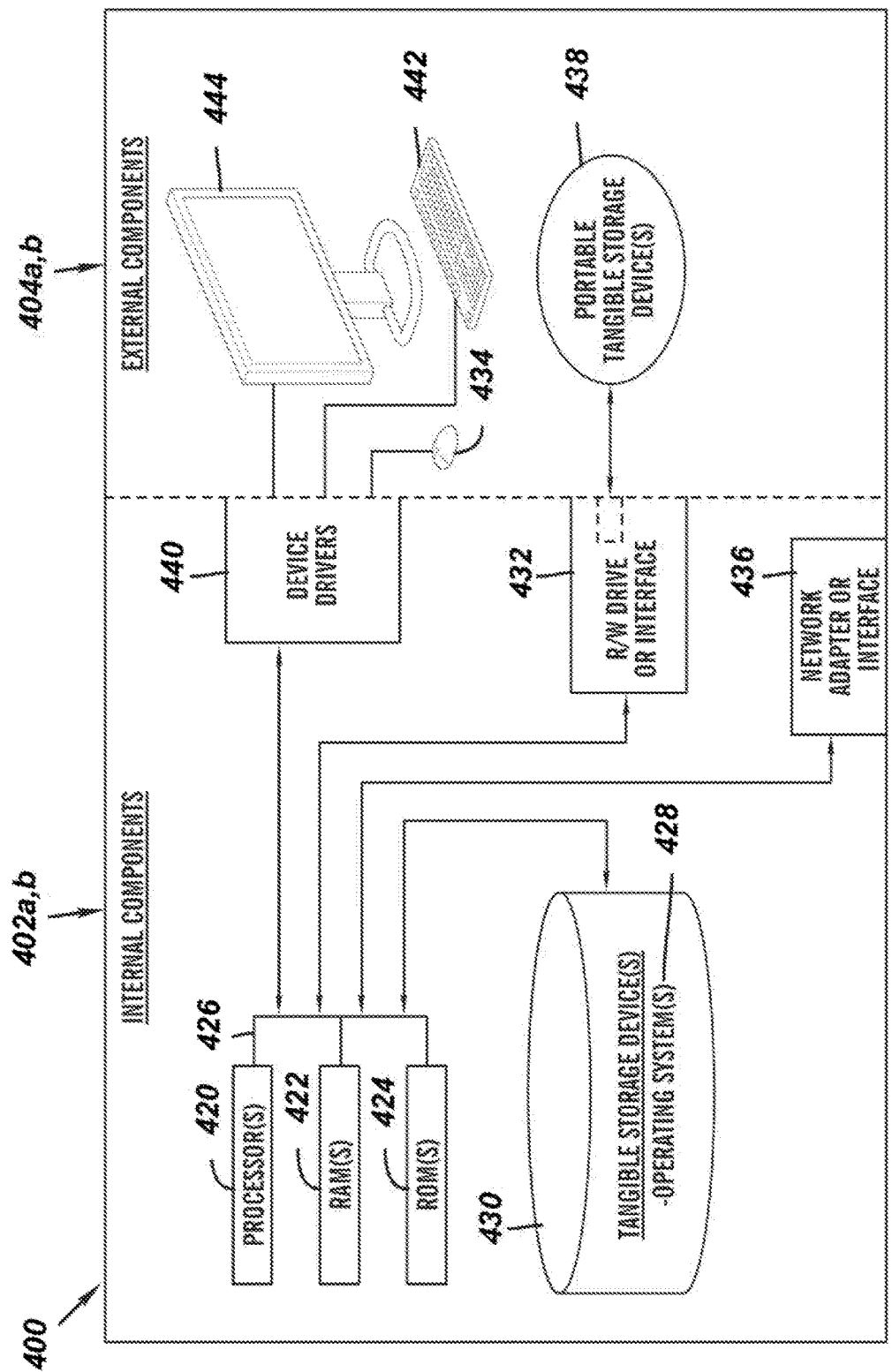
FIG. 4 is a block diagram of components of a computing device of the system for enhancing voice quality for online meetings of FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the photographic capture setting program 110A in the client computing device 102 and the photographic capture setting program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the photographic capture setting program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the photographic capture setting program 110A in the client computing device 102 and the photographic capture setting program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the photographic capture setting program 110A in the client computing device 102 and the photographic capture setting program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
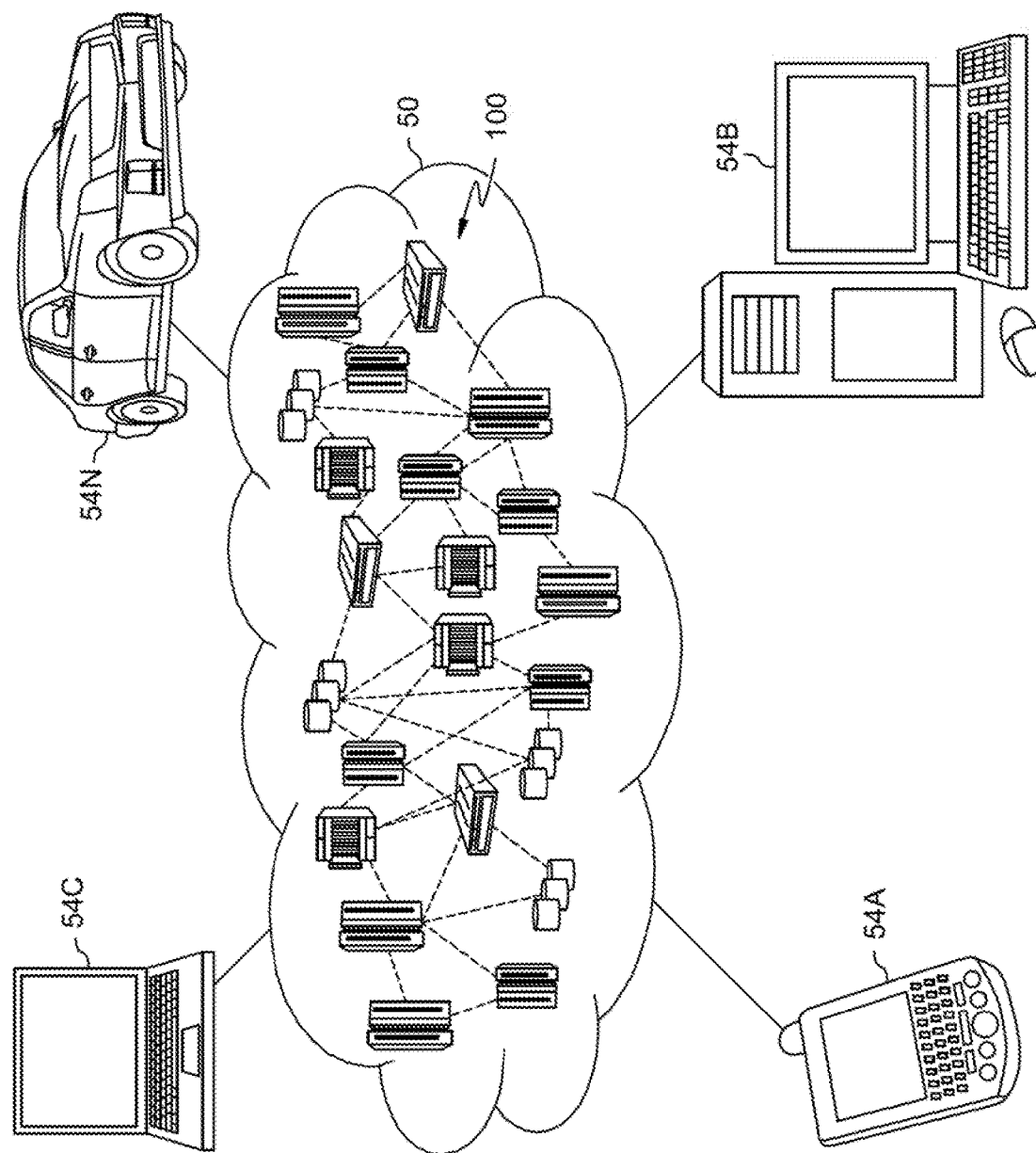
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
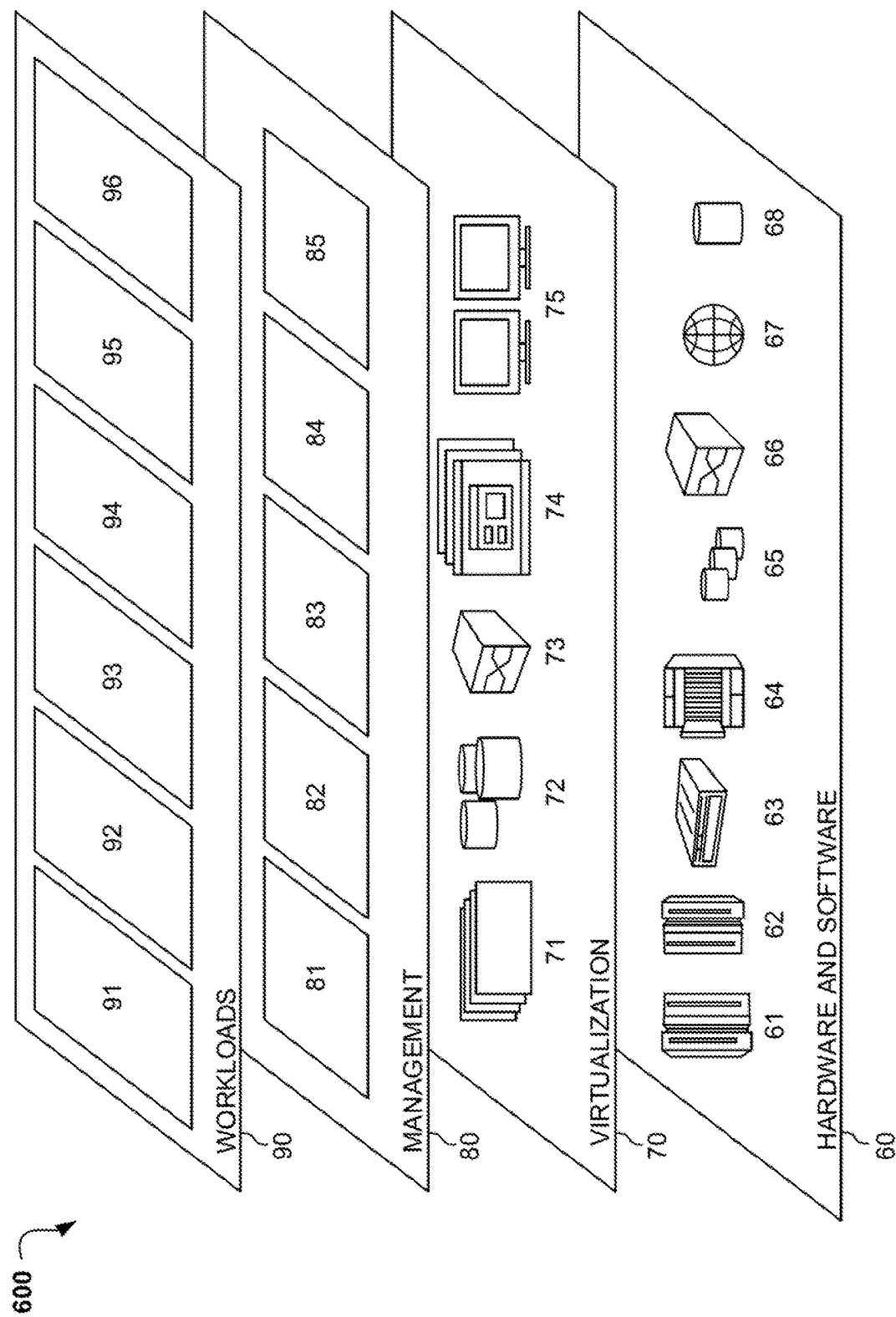
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and photographic capture setting alteration through user feedback 96. Photographic capture setting alteration through user feedback 96 may relate to capturing user feedback, such as voice-based commentary on a captured photograph or user action subsequent to viewing a captured photograph, in order to generate a knowledge base for modifying photographic capture device settings based on user preferences derived from the user feedback.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    capturing, by a processor, user feedback of a photograph;
    identifying user preferences for one or more device parameters based on image recognition and machine learning of the photograph and the captured user feedback, respectively, wherein each identified user preference has one or more contextual tags;
    generating a corpus, wherein the corpus comprises the identified user preferences;
    in response to determining a user is preparing to capture a photograph, deriving one or more viewfinder tags for a scene currently within a viewfinder of a capture device;
    identifying one or more device parameters based on a matching of the one or more derived viewfinder tags and the one or more contextual tags; and
    in response to determining current user settings of the one or more identified device parameters do not match the identified user preferences, performing an action.

2. The method of claim 1, wherein the user feedback is selected from a group consisting of voice-based commentary, user facial expressions, a change in behavior, user body language, deletion of the photograph, or recapture of the photograph.

3. The method of claim 1, wherein one or more surrounding smart devices are utilized to capture the user feedback, and wherein the one or more surrounding smart devices are selected from a group consisting of a smart television, a laptop, a voice assistant device, a wearable smart device or any other device capable of capturing data and transmitting the captured data to a device.

4. The method of claim 1, wherein the identified user preferences are variably weighted based on a severity of user sentiment toward an aspect of the photograph.

5. The method of claim 1, further comprising:
    in response to determining an item within the capture device viewfinder relates to non-camera parameters and the item is unwanted by the user based on the identified user preferences within the generated corpus, providing a visual notification of the non-camera parameters to the user on a user device display screen or voice-based guidance through a speaker embedded or communicatively coupled to the capture device.

6. The method of claim 1, wherein the action comprises performing an automatic modification of the one of more identified device parameters so each parameter matches a user preference within the identified user preferences for the viewfinder tags that match the contextual tags within the generated corpus.

7. The method of claim 1, wherein the action comprises displaying a notification to a display screen of a user device with which the user is performing photographic capture that displays the device parameters the user has historically preferred in similar contexts.

8. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    capturing user feedback of a photograph;
    identifying user preferences for one or more device parameters based on image recognition and machine learning of the photograph and the captured user feedback, respectively, wherein each identified user preference has one or more contextual tags;
    generating a corpus, wherein the corpus comprises the identified user preferences;
    in response to determining a user is preparing to capture a photograph, deriving one or more viewfinder tags for a scene currently within a viewfinder of a capture device;
    identifying one or more device parameters based on a matching of the one or more derived viewfinder tags and the one or more contextual tags; and
    in response to determining current user settings of the one or more identified device parameters do not match the identified user preferences, performing an action.

9. The computer system of claim 8, wherein the user feedback is selected from a group consisting of voice-based commentary, user facial expressions, a change in behavior, user body language, deletion of the photograph, or recapture of the photograph.

10. The computer system of claim 8, wherein one or more surrounding smart devices are utilized to capture the user feedback, and wherein the one or more surrounding smart devices are selected from a group consisting of a smart television, a laptop, a voice assistant device, a wearable smart device or any other device capable of capturing data and transmitting the captured data to a device.

11. The computer system of claim 8, wherein the identified user preferences are variably weighted based on a severity of user sentiment toward an aspect of the photograph.

12. The computer system of claim 8, further comprising:
    in response to determining an item within the capture device viewfinder relates to non-camera parameters and the item is unwanted by the user based on the identified user preferences within the generated corpus, providing a visual notification of the non-camera parameters to the user on a user device display screen or voice-based guidance through a speaker embedded or communicatively coupled to the capture device.

13. The computer system of claim 8, wherein the action comprises performing an automatic modification of the one of more identified device parameters so each parameter matches a user preference within the identified user preferences for the viewfinder tags that match the contextual tags within the generated corpus.

14. The computer system of claim 8, wherein the action comprises displaying a notification to a display screen of a user device with which the user is performing photographic capture that displays the device parameters the user has historically preferred in similar contexts.

15. A computer program product, the computer program product comprising:

one or more computer-readable tangible storage medium and program instructions stored on at least one of the one or more tangible storage medium, the program instructions executable by a processor capable of performing a method, the method comprising:

capturing user feedback of a photograph;

identifying user preferences for one or more device parameters based on image recognition and machine learning of the photograph and the captured user feedback, respectively, wherein each identified user preference has one or more contextual tags;

generating a corpus, wherein the corpus comprises the identified user preferences;

in response to determining a user is preparing to capture a photograph, deriving one or more viewfinder tags for a scene currently within a viewfinder of a capture device;

identifying one or more device parameters based on a matching of the one or more derived viewfinder tags and the one or more contextual tags; and in response to determining current user settings of the one or more identified device parameters do not match the identified user preferences, performing an action.

16. The computer program product of claim 15, wherein the user feedback is selected from a group consisting of voice-based commentary, user facial expressions, a change in behavior, user body language, deletion of the photograph, or recapture of the photograph.

17. The computer program product of claim 15, wherein one or more surrounding smart devices are utilized to capture the user feedback, and wherein the one or more surrounding smart devices are selected from a group consisting of a smart television, a laptop, a voice assistant device, a wearable smart device or any other device capable of capturing data and transmitting the captured data to a device.

18. The computer program product of claim 15, wherein the identified user preferences are variably weighted based on a severity of user sentiment toward an aspect of the photograph.

19. The computer program product of claim 15, further comprising:

in response to determining an item within the capture device viewfinder relates to non-camera parameters and the item is unwanted by the user based on the identified user preferences within the generated corpus, providing a visual notification of the non-camera parameters to the user on a user device display screen or voice-based guidance through a speaker embedded or communicatively coupled to the capture device.

20. The computer program product of claim 15, wherein the action comprises performing an automatic modification of the one of more identified device parameters so each parameter matches a user preference within the identified user preferences for the viewfinder tags that match the contextual tags within the generated corpus.

* * * * *